W. S. RILEY.
AUTO WHEEL DEVICE.
APPLICATION FILED MAR. 10, 1915.
1,267,455.
Patented May 28, 1918.
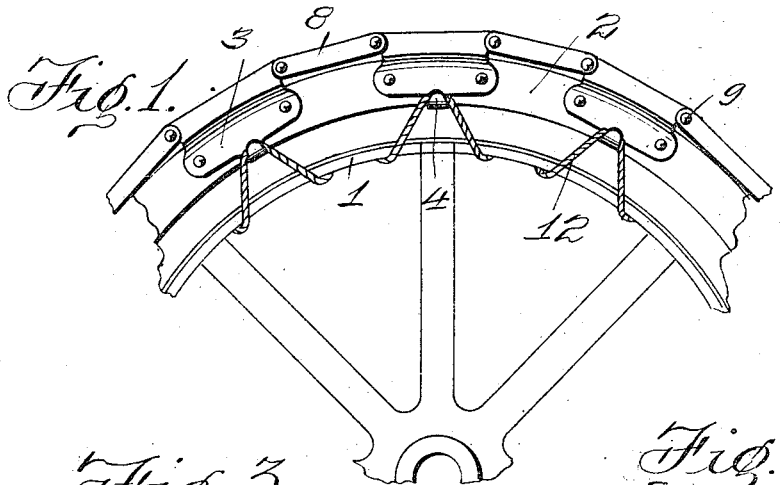
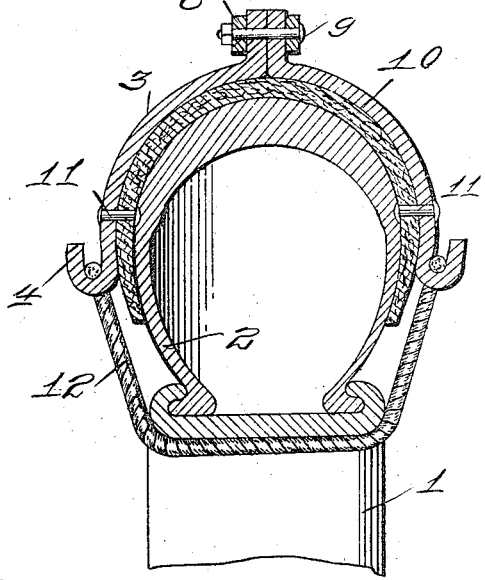
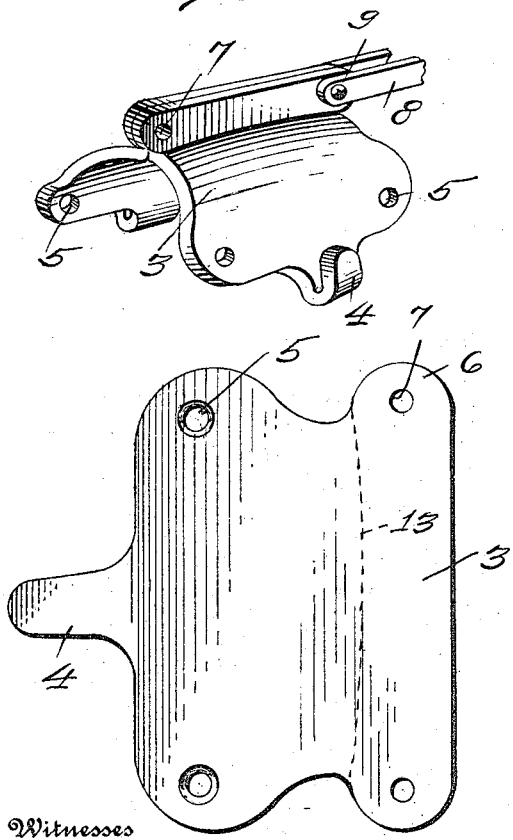
Witnesses
Rob't C. Sidwell
Carroll Bailey
Inventor
Winfield S. Riley
By Richard B. Owen,
Attorney

UNITED STATES PATENT OFFICE.

WINFIELD S. RILEY, OF OAKHILL, KANSAS.

AUTO-WHEEL DEVICE.

1,267,455.  Specification of Letters Patent.  Patented May 28, 1918.

Application filed March 10, 1915. Serial No. 13,521.

*To all whom it may concern:*

Be it known that I, WINFIELD S. RILEY, a citizen of United States, residing at Oakhill, in the county of Clay and State of Kansas, have invented certain new and useful Improvements in Auto-Wheel Devices, of which the following is a specification.

This invention relates to vehicle wheels, and more particularly to guards for pneumatic tires.

An object of the invention is to provide an attachment which will serve the purposes of an anti-skid device, a shield to prevent punctures and means to increase the driving efficiency of the wheels.

Another object of the invention is to so construct the attachment that the same may be readily and easily applied to or disengaged from the tire.

A further object is to provide a shield disposed between the attachment and the casing to protect the casing against wear.

A still further object is to construct the attachment of flexible sheet metal which is bent to the required size and shape, thus reducing the cost and providing an attachment which is easy to manufacture.

With these and other objects in view the invention consists in the novel features of construction, combination and arrangement of parts, as will be hereinafter more fully described, illustrated in the accompanying drawings, and claimed.

In the drawings:

Figure 1 is a fragmentary side elevation of a vehicle wheel equipped with the improved attachment.

Fig. 2 is a transverse sectional view on the line 2—2 of Fig. 1.

Fig. 3 is a detail perspective view of one of the plates.

Fig. 4 is a plan view of the blank on which the plates are formed.

Referring to the drawings by numerals, 1 designates the rim and 2 the pneumatic tire which is secured thereon in the ordinary manner, both of which are of the ordinary construction. In order to accomplish the object previously set forth, plates 3 are provided. Two of these plates are adapted to be suitably bent and fastened together to form one of the improved plates.

Each of the plates 3 comprises a substantially rectangular shaped piece of metal having a tongue 4 formed on and projecting laterally from one face thereof. The corners of the plate on which side the tongue 4 projects are rounded and provided with apertures 5. The opposite corners of the plate are rounded as at 6 and have apertures 7 formed therein so that when the plate is bent to the form as shown in Fig. 3 of the drawings the downward portion will project beyond the plane of the end of the plate to be connected by suitable links 8, the tongue 4 having first been bent to lie parallel with the side of the plates 3 as clearly shown in Figs. 1, 2, and 3 of the drawings, for a purpose which will presently appear.

After forming the plates in the manner mentioned, the same are placed upon the tire of the wheel and connected by the links 8 through the medium of bolts 9 which pass through alined apertures in the links and the apertures 7 of the plates 3.

A shield 10 preferably constructed of leather or other similar structure and of a shape substantially the same as the contour of the plates 3 is adapted to be inserted between the plates and the tire to prevent wear on the tire caused by the constant friction of the plate wearing thereover; bolts 11 being passed through the openings 5 and alining opening in the shield in order to secure the shield thereto.

In order to secure the plates to the tire and insure for the quick and easy detachment of the same, a lacing 12 is passed beneath the rim 1 and alternately over the tongues 4 upon opposite sides of the tire.

From the showing of the drawings it will be noted that when the plates 3 are bent upon the dotted lines 13, as shown in Fig. 4 of the drawings, an upstanding tread will be provided which will prevent skidding and increase the driving efficiency of the wheel over muddy roads.

From the foregoing description taken in connection with the accompanying drawings, it is thought that the construction and operation of the device will be clearly understood, and while I have herein shown and described one specific form of my invention, I do not wish to be limited thereto except to such limitations as the claims may import.

I claim:

1. Tire protecting means, comprising alternate attaching link members and intermediate connecting links, each attaching link member comprising similar halves which unitedly extend over the tread and along the sides of the tire and having attaching elements at their inner edges and abutting flanges at their outer edges to provide tractor lugs and link elements.

2. Tire protecting means, comprising alternating attaching link members, each attaching link member comprising similar halves which unitedly extend over the tread and along the sides of the tire and having attaching elements at their inner edges and abutting flanges at their outer edges to provide tractor lugs and link elements, intermediate links, and fastenings passing through the links and flanges to pivotally connect such parts and also serving as securing means for the halves of the attaching link members.

In testimony whereof I affix my signature in presence of two witnesses.

WINFIELD S. RILEY.

Witnesses:
E. A. RECTOR,
WEB MALCALM.

Copies of this patent may be obtained for five cents each, by addressing the "Commissioner of Patents, Washington, D. C."